(No Model.)

E. HERRINGTON.
ANIMAL TRAP.

No. 378,789. Patented Feb. 28, 1888.

Witnesses.
A. Ruppert.
Thomas P. Simpson

Inventor.
Ephraim Herrington.

UNITED STATES PATENT OFFICE.

EPHRAIM HERRINGTON, OF MOUNT VERNON, ASSIGNOR OF ONE-HALF TO M. M. BUSH, OF TOWNS, GEORGIA.

ANIMAL-TRAP.

SPECIFICATION forming part of Letters Patent No. 378,789, dated February 28, 1888.

Application filed September 14, 1887. Serial No. 249,702. (No model.)

*To all whom it may concern:*

Be it known that I, EPHRAIM HERRINGTON, a citizen of the United States, residing at Mount Vernon, in the county of Montgomery and State of Georgia, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a trap for rats, mice, or other animals, so that one or more may freely enter but be unable to return through the same passway outwardly.

Figure 1:
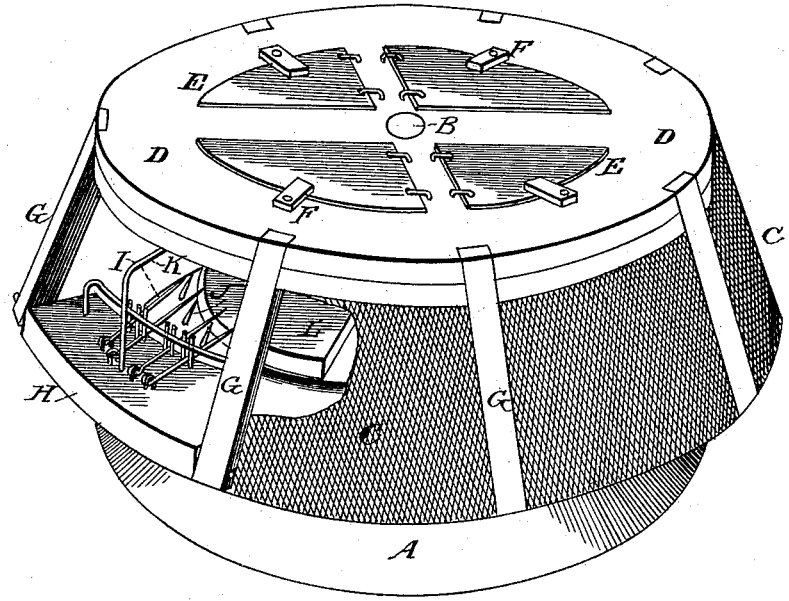
Figure 2:
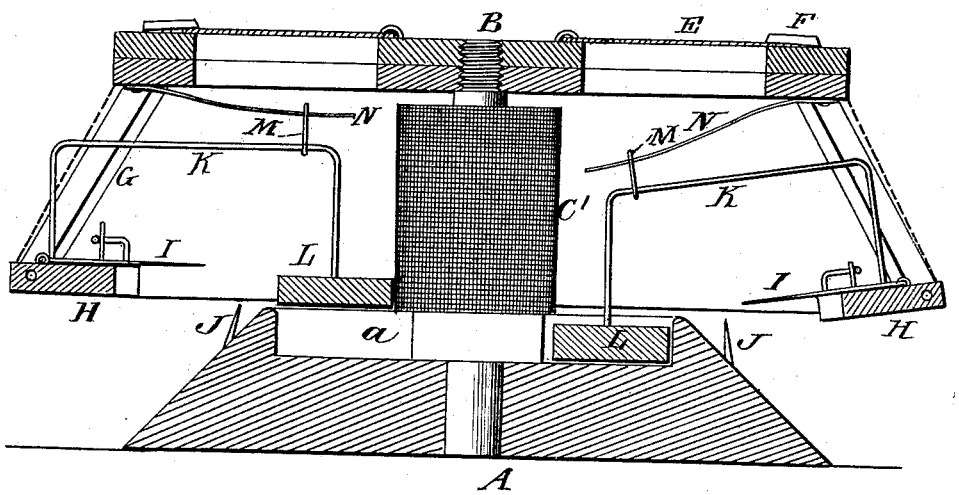

Figure 1 of the drawings is a perspective view of my trap, and Fig. 2 a diametrical vertical section with the bait-receptacle in elevation.

In the drawings, A represents the base of the trap, in which is let the foot of a post, B, surrounded by a wire-netting, C, in which is placed the bait. The upper end of this post is threaded to work in a central thread in the trap-cover D. The latter is provided with hinged doors E, which may be held by pivoted latches F, so that the animals cannot push them open. This cover D is connected by the diverging bars G with the side pivots on the plates H, which support the rear pivoted needles, I, that extend toward the center of the trap. In connection with the needles I are employed the upwardly-projecting sharp points J. In order to adjust the needles I with respect to the points J so as to catch animals of different sizes, I screw the center of the cover D on the threaded end of the post B, so as to bring said needles at a greater or less distance from said points. The pivoted plates H are connected by the twice-bent rods K with the movable platforms L. These platforms are held in the same horizontal plane with the plates H by the rings M and springs N, the latter being fastened at the rear to the under side of the edge of the cover; but when the animal steps on the platform in order to smell at the bait within the wire-netting C' the platform sinks into the opening a at the top of the base A, so as to cause the needles I to approach nearer to the points J, as shown on the right of Fig. 2 of the drawings, and the needles and points are brought so close together that the animal cannot go out. In entering, the animal presses upwardly against the needles, and these, being rear-pivoted, rise to give him an easy entrance; but they resist his outgoing without yielding downwardly.

The wire-netting C is fastened to the bars G, so as to surround the space in which the animal is to be imprisoned, while the light is not excluded from the inside. The said space is shown as one prison-chamber for all animals which enter the trap; but it might be divided into compartments without departing from the principle of my invention.

What I claim as new, and desire to protect by Letters Patent, is—

1. An animal-trap having fixed vertical points and superposed hinged needles, between which the animals may enter, the vertical points being in the base and the needles on horizontal plates, as shown and described.

2. The needle-plates H and platform I of an animal-trap, in combination with the rods K, having two arms connecting with said parts H I, and the springs N, connecting with the subjacent rods by rings M, as and for the purpose set forth.

In testimony whereof I affix my signature in presence of two witnesses.

EPHRAIM HERRINGTON.

Witnesses:
A. RUPPERT,
THOMAS P. SIMPSON.